US010723820B2

(12) United States Patent
Ishii et al.

(10) Patent No.: US 10,723,820 B2
(45) Date of Patent: Jul. 28, 2020

(54) METHOD FOR PRODUCING VINYLAMINE UNIT-CONTAINING POLYMER AND POLYMERIZATION PRODUCT

(71) Applicant: MITSUBISHI CHEMICAL CORPORATION, Chiyoda-ku (JP)

(72) Inventors: Akihiro Ishii, Yokohama (JP); Yasuharu Mori, Yokohama (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/301,459

(22) PCT Filed: Apr. 6, 2015

(86) PCT No.: PCT/JP2015/060747
§ 371 (c)(1),
(2) Date: Oct. 3, 2016

(87) PCT Pub. No.: WO2015/156251
PCT Pub. Date: Oct. 15, 2015

(65) Prior Publication Data
US 2017/0183425 A1    Jun. 29, 2017

(30) Foreign Application Priority Data
Apr. 8, 2014  (JP) ................................ 2014-079413

(51) Int. Cl.
| C08F 8/12 | (2006.01) |
| C08F 126/02 | (2006.01) |
| C08F 2/44 | (2006.01) |
| C08F 226/02 | (2006.01) |
| C08F 4/04 | (2006.01) |
| C08F 2/32 | (2006.01) |
| C08F 4/34 | (2006.01) |
| C08F 26/02 | (2006.01) |

(52) U.S. Cl.
CPC ................ C08F 8/12 (2013.01); C08F 2/32 (2013.01); C08F 2/44 (2013.01); C08F 4/04 (2013.01); C08F 4/34 (2013.01); C08F 26/02 (2013.01); C08F 126/02 (2013.01); C08F 226/02 (2013.01)

(58) Field of Classification Search
CPC .......... C08F 8/12; C08F 26/02; C08F 126/02; C08F 2/44; C08F 2/32; C08F 4/04; C08F 4/34; C08F 226/02
USPC ...................................................... 525/329.5
See application file for complete search history.

(56) References Cited

U.S. PATENT DOCUMENTS

| 4,814,505 A | 3/1989 | Kroener et al. | |
| 5,391,710 A * | 2/1995 | Ford | C08F 8/12 |
| | | | 525/328.2 |
| 6,541,573 B1 | 4/2003 | Niessner et al. | |
| 6,797,785 B1 | 9/2004 | Hund et al. | |
| 2005/0008603 A1* | 1/2005 | Marchant | A61L 27/34 |
| | | | 424/70.14 |
| 2010/0021992 A1* | 1/2010 | Haering | C08F 6/006 |
| | | | 435/262 |
| 2011/0230583 A1* | 9/2011 | Shimizu | C08F 2/44 |
| | | | 522/84 |
| 2014/0017505 A1* | 1/2014 | Sodeyama | D21H 17/37 |
| | | | 428/514 |

FOREIGN PATENT DOCUMENTS

| EP | 0 942 016 A2 | 9/1999 |
| JP | 58-23809 A | 2/1983 |
| JP | 61-97309 A | 5/1986 |
| JP | 61-134359 A | 6/1986 |
| JP | 62-190153 A | 8/1987 |
| JP | 1-174509 A | 7/1989 |
| JP | 5-125109 A | 5/1993 |
| JP | 6-287232 A | 10/1994 |
| JP | 7-258346 A | 10/1995 |
| JP | 9-323963 A | 12/1997 |
| JP | 11-315116 | 11/1999 |
| JP | 2001-31717 A | 2/2001 |
| JP | 2003-147007 A | 5/2003 |
| JP | 2008-544054 A | 12/2008 |
| WO | WO 99/55742 A1 | 11/1999 |

OTHER PUBLICATIONS

International Search Report dated Jun. 30, 2015 in PCT/JP2015/060747 filed Apr. 6, 2015.
Extended European Search Report dated Apr. 19, 2017 in Patent Application No. 15776209.7.
Combined Office Action and Search Report dated Jan. 24, 2018 in Chinese Patent Application No. 201580018509.1 (with unedited computer generated English translation obtained by Global Dossier on Nov. 7, 2018 and English translation of categories of cited documents).
"Water-Soluble Polymer Product Manual" Chemical Industry Press, 2003, pp. 170-172 and Cover Pages (with partial English translation).
Office Action dated Sep. 4, 2018 in Chinese Patent Application No. 201580018509.1 with unedited computer generated English translation obtained by Global Dossier on Nov. 7, 2018.

* cited by examiner

Primary Examiner — Michael Bernshteyn
(74) Attorney, Agent, or Firm — Oblon, McClelland, Maier & Neustadt, L.L.P.

(57) ABSTRACT

The present invention relates to a method for producing a vinylamine unit-containing polymer, the method comprising: preparing a mixture for polymerization (a) containing N-vinylformamide as a monomer component by using crude N-vinylformamide which contains the N-vinylformamide and formamide and has a content of the formamide of 1 part by mass or more with respect to 100 parts by mass of the N-vinylformamide; obtaining a polymerization product (b) containing an N-vinylformamide unit-containing polymer and formamide by polymerizing the monomer component in the mixture for polymerization (a); and obtaining a hydrolysis product (c) containing a vinylamine unit-containing polymer through a hydrolysis treatment of the polymerization product (b) using an acid or a base.

9 Claims, No Drawings

METHOD FOR PRODUCING VINYLAMINE UNIT-CONTAINING POLYMER AND POLYMERIZATION PRODUCT

TECHNICAL FIELD

The present invention relates to a method for producing a vinylamine unit-containing polymer, and a polymerization product containing an N-vinylformamide unit-containing polymer that is an intermediate when producing a vinylamine unit-containing polymer.

This application is based upon and claims the benefit of priority of the prior Japanese Patent Application No. 2014-079413 filed in Japan on Apr. 8, 2014, the entire contents of which are incorporated herein by reference.

BACKGROUND ART

Vinylamine unit-containing polymers are widely used in flocculants, papermaking chemicals, fiber treatment agents, and the like. As the method for producing vinylamine unit-containing polymers, various kinds of production methods are known, a method to hydrolyze the carboxylic acid amide group (—NHC(=O)R (where, R is a hydrogen atom, a hydrocarbon group, or the like)) in an N-vinylcarboxylic acid amide unit-containing polymer is useful from the industrial point of view, and a method to hydrolyze the formamide group (—NHC(=O)H) in an N-vinylformamide unit-containing polymer is especially useful from the viewpoint that it is relatively easy to conduct the hydrolysis and it is easy to convert to a vinylamine unit-containing polymer (Patent Literatures 1 and 2).

The following methods are known as the production method of N-vinylformamide that is a raw material of an N-vinylformamide unit-containing polymer.

(1) A method to obtain N-vinylformamide by thermal decomposition of N-methoxyethylformamide (Patent Literature 3).

(2) A method to obtain N-vinylformamide by thermal decomposition of N-cyanoethylformamide (Patent Literature 4).

In both methods of (1) and (2), the starting material is formamide, and thus formamide is mixed in N-vinylformamide obtained by thermal decomposition of N-methoxyethylformamide or N-cyanoethylformamide. Hence, the following problems are caused in a case in which an N-vinylformamide unit-containing polymer is produced by using crude N-vinylformamide containing formamide and a vinylamine unit-containing polymer is produced through hydrolysis of the formamide group in the N-vinylformamide unit-containing polymer.

Formamide is mixed in the vinylamine unit-containing polymer to be obtained as well. It is not preferable that formamide is mixed from the viewpoint of quality in the case of using the vinylamine unit-containing polymer as a papermaking chemical, a fiber treatment agent, and the like.

Formamide has a greater chain transfer constant than water, and thus the molecular weight of an N-vinylformamide unit-containing polymer obtained by polymerizing N-vinylformamide in the presence of formamide is lower than that of an N-vinylformamide unit-containing polymer obtained by polymerizing N-vinylformamide in the absence of formamide.

Accordingly, in general, crude N-vinylformamide containing formamide is purified to obtain purified N-vinylformamide, an N-vinylformamide unit-containing polymer is then produced by using the purified N-vinylformamide, and a vinylamine unit-containing polymer is produced through hydrolysis of the formamide group in the N-vinylformamide unit-containing polymer. Examples of the purification method of crude N-vinylformamide may include a method by distillation and a method by extraction.

However, there are the following problems in the method by distillation.

The boiling point of formamide is close to the boiling point of N-vinylformamide, and thus multistage precision distillation (fractional distillation) accompanied by reflux is required in order to separate N-vinylformamide from formamide by distillation (Patent Literatures 5 and 6). For the multistage precision distillation, complicated and large-scale equipment (fractionator or the like) is required, and thus the purification of crude N-vinylformamide is not conveniently conducted by the method by distillation.

N-vinylformamide is unstable as compared to other vinylamides, especially it is thermally unstable, and thus it is required to be carefully handled. The yield of N-vinylformamide decreases by decomposition and the like in some cases in the case of attempting to obtain purified N-vinylformamide having a high purity by multistage precision distillation accompanied by reflux.

There is the following problem in the method by extraction.

The equipment for extraction is large and a great amount of solvent is required, and thus the method by extraction is not practical.

CITATION LIST

Patent Literature

Patent Literature 1: JP 58-23809 A
Patent Literature 2: U.S. Pat. No. 6,797,785
Patent Literature 3: JP 61-97309 A
Patent Literature 4: JP 61-134359 A
Patent Literature 5: JP 62-190153 A
Patent Literature 6: JP 9-323963 A

SUMMARY OF THE INVENTION

Problem to be Solved by the Invention

An object of the invention is to provide a method which can produce a high-quality vinylamine unit-containing polymer of which a decrease in molecular weight is suppressed even by using crude N-vinylformamide containing formamide, and a polymerization product which contains an N-vinylformamide unit-containing polymer of an intermediate when producing a vinylamine unit-containing polymer and is easily crushed after drying.

Means for Solving Problem

The present inventors have carried out intensive investigations in view of the above circumstances, and as a result, they have found out that (i) the chain transfer constant of formamide is not so great at the time of polymerization of N-vinylformamide and thus the influence of formamide on the polymerization of N-vinylformamide is minor although formamide is present to a certain extent, and (ii) the hydrolysis rate of formamide is sufficiently faster than the hydrolysis rate of the formamide group in an N-vinylformamide unit-containing polymer in the presence of an acid (preferably a strong acid) or a base (preferably a strong base) and thus the influence of formamide to the hydrolysis of the formamide group in the N-vinylformamide unit-containing polymer is minor although formamide is present to a certain extent, thereby completing the invention.

In addition, (iii) when a polymerization product containing an N-vinylformamide unit-containing polymer of an intermediate when producing a vinylamine unit-containing polymer contains formamide in a particular amount, formamide having a higher boiling point remains although the polymerization product is dried so that moisture is sufficiently removed, and thus the dried polymerization product is not too hard so as to be easily crushed when being formed into a powder, thereby completing the invention.

In other words, the invention has the following aspects.

<1> A method for producing a vinylamine unit-containing polymer, the method including:

preparing a mixture for polymerization (a) containing N-vinylformamide as a monomer component by using crude N-vinylformamide which contains the N-vinylformamide and formamide and has a content of the formamide of 1 part by mass or more with respect to 100 parts by mass of the N-vinylformamide;

obtaining a polymerization product (b) containing an N-vinylformamide unit-containing polymer and formamide by polymerizing the monomer component in the mixture for polymerization (a); and obtaining a hydrolysis product (c) containing a vinylamine unit-containing polymer through a hydrolysis treatment of the polymerization product (b) using an acid or a base.

<2> The method for producing a vinylamine unit-containing polymer according to <1>, in which a content of formamide in the hydrolysis product (c) is 0.1 part by mass or less with respect to 100 parts by mass of the vinylamine unit-containing polymer.

<3> The method for producing a vinylamine unit-containing polymer according to <1> or <2>, in which the polymerization product (b) is subjected to a hydrolysis treatment at 50° C. or higher.

<4> The method for producing a vinylamine unit-containing polymer according to any one of <1> to <3>, in which 10% by mole or more of 100% by mole of the formamide group before a hydrolysis treatment in the N-vinylformamide unit-containing polymer is hydrolyzed when a hydrolysis treatment of the polymerization product (b) is conducted.

<5> The method for producing a vinylamine unit-containing polymer according to any one of <1> to <4>, the method further including:

obtaining a thermal decomposition product containing N-vinylformamide and formamide through a thermal decomposition treatment of crude N-methoxyethylformamide containing N-methoxyethylformamide and formamide and obtaining crude N-vinylformamide having a content of formamide of 1 part by mass or more with respect to 100 parts by mass of N-vinylformamide through purification of the thermal decomposition product by a purification method not accompanied by reflux.

<6> The method for producing a vinylamine unit-containing polymer according to any one of <1> to <5>, the method further including:

drying and forming the polymerization product (b) into a powder before subjecting the polymerization product (b) to a hydrolysis treatment.

<7> The method for producing a vinylamine unit-containing polymer according to any one of <1> to <6>, in which an amount of substance (mole) of formamide contained in the crude N-vinylformamide is smaller than an amount of substance (mole) of a formamide group to be hydrolyzed in an N-vinylformamide unit-containing polymer.

<8> The method for producing a vinylamine unit-containing polymer according to any one of <1> to <7>, in which a content of formamide in the crude N-vinylformamide is from 1 to 20 parts by mass with respect to 100 parts by mass of N-vinylformamide.

<9> The method for producing a vinylamine unit-containing polymer according to any one of <1> to <8>, in which polymerization for obtaining the polymerization product (b) is adiabatic polymerization or photopolymerization.

<10> The method for producing a vinylamine unit-containing polymer according to any one of <1> to <9>, in which polymerization for obtaining the polymerization product (b) is adiabatic polymerization and ferrous sulfate is used as a polymerization initiator.

<11> A polymerization product containing an N-vinylformamide unit-containing polymer and formamide, in which the polymerization product is obtained by polymerizing a monomer component containing N-vinylformamide, and a content of formamide in the polymerization product is from 1 to 20 parts by mass with respect to 100 parts by mass of the N-vinylformamide unit-containing polymer.

Effect of the Invention

According to the method for producing a vinylamine unit-containing polymer of the invention, it is possible to produce a high-quality vinylamine unit-containing polymer of which a decrease in molecular weight is suppressed even by using crude N-vinylformamide containing formamide.

The polymerization product of the invention is a polymerization product which contains an N-vinylformamide unit-containing polymer of an intermediate when producing a vinylamine unit-containing polymer and is easily crushed after drying.

MODE(S) FOR CARRYING OUT THE INVENTION

The definitions of the following terms apply throughout the present specification and claims.

The term "monomer" means a compound having an ethylenically unsaturated bond.

The term "unit" in the polymer means a constitutional unit derived from a monomer formed by polymerizing a monomer or a constitutional unit obtained as a part of the constitutional unit is transformed into another structure by treating the polymer.

The term "N-vinylformamide unit-containing polymer" means a homopolymer composed of an N-vinylformamide unit or a copolymer having an N-vinylformamide unit and another constitutional unit other than this (however, a copolymer having an N-vinylformamide unit and a vinylamine unit is excluded).

The term "vinylamine unit-containing polymer" means a homopolymer composed of a vinylamine unit or a copolymer having a vinylamine unit and another constitutional unit other than this. The vinylamine unit may be in the form of a salt.

The term "crude N-methoxyethylformamide" means a mixture containing N-methoxyethylformamide and formamide.

The term "crude N-vinylformamide" means a mixture which contains N-vinylformamide and formamide and has a content of formamide of 1 part by mass or more with respect to 100 parts by mass of N-vinylformamide.

The term "purified N-vinylformamide" means one that is obtained by purifying crude N-vinylformamide and it is N-vinylformamide in which formamide is not mixed or a mixture which contains N-vinylformamide and formamide and has a content of formamide of less than 1 part by mass with respect to 100 parts by mass of N-vinylformamide.

The term "mixture for polymerization (a)" means a mixture containing a monomer component that is prepared by using at least a monomer-containing raw material (crude N-vinylformamide or the like). The mixture for polymerization (a) may contain a compound (impurities mixed in the monomer-containing raw material, a polymerization initiator, a solvent, and other known additives) other than the monomer component.

The term "polymerization product (b)" means one that is obtained by polymerizing a monomer component in the mixture for polymerization (a). The polymerization product (b) may contain a compound other than the monomer component contained in the mixture for polymerization (a), it may be one that is obtained by drying and forming the polymerization product (b) obtained immediately after the polymerization of the monomer component into a powder, or it may be one that is obtained by dissolving or dispersing the powdery polymerization product (b) in water again.

The term "hydrolysis product (c)" is one that is obtained through the hydrolysis treatment of the polymerization product (b). The hydrolysis product (c) may contain a compound other than the polymer contained in the polymerization product (b) or impurities of the by-product by the hydrolysis treatment, it may be one that is obtained by drying and forming the hydrolysis product (c) obtained immediately after the hydrolysis treatment into a powder, or it may be one that is obtained by dissolving or dispersing the powdery hydrolysis product (c) in water again.

The term "(meth)acrylic acid" is a general term for acrylic acid and methacrylic acid.

The term "(meth)acrylic acid ester" is a general term for an acrylic acid ester and a methacrylic acid ester.

The term "(meth)acrylonitrile" is a general term for acrylonitrile and methacrylonitrile.

The term "(meth)acrylamide" is a general term for acrylamide and methacrylamide.

<Method for Producing Vinylamine Unit-Containing Polymer>

Examples of the method for producing a vinylamine unit-containing polymer of the invention may include a method having the following step (I) to step (V).

(I) A step of obtaining crude N-vinylformamide having a content of formamide of 1 part by mass or more with respect to 100 parts by mass of N-vinylformamide, if necessary.

(II) A step of preparing a mixture for polymerization (a) containing N-vinylformamide as a monomer component by using crude N-vinylformamide in which the content of formamide is 1 part by mass or more with respect to 100 parts by mass of N-vinylformamide.

(III) A step of obtaining a polymerization product (b) containing an N-vinylformamide unit-containing polymer and formamide by polymerizing the monomer component in the mixture for polymerization (a).

(IV) A step of drying and forming the polymerization product (b) into a powder between the step (III) and the step (V), if necessary.

(V) A step of obtaining a hydrolysis product (c) containing a vinylamine unit-containing polymer through a hydrolysis treatment of the polymerization product (b) using an acid or a base.

(Step (I))

Examples of the method for producing N-vinylformamide may include the following methods.

(1) A method to obtain N-vinylformamide through the thermal decomposition of N-methoxyethylformamide (Patent Literature 3).

(2) A method to obtain N-vinylformamide through the thermal decomposition of N-cyanoethylformamide (Patent Literature 4).

(3) A method to obtain N-vinylformamide from ethylenebisformamide.

Among these methods, the method of (1) is preferable from the viewpoint of improving the overall yield by simplifying the purification of crude N-vinylformamide and of obtaining a high-quality vinylamine unit-containing polymer as to be described below.

According to the method of (1), the content of formamide in the thermal decomposition product (crude N-vinylformamide) containing N-vinylformamide and formamide obtained through the thermal decomposition treatment of crude N-methoxyethylformamide containing N-methoxyethylformamide and formamide is about several percent by mass as described in Patent Literature 3. When the content of formamide is about several percent by mass, formamide is hydrolyzed in the step (V) so as not to affect the quality of the vinylamine unit-containing polymer. In addition, formamide is hydrolyzed in the step (V), and thus it is not required to conduct multistage precision distillation accompanied by reflux in the step (I). Hence, the yield of N-vinylformamide does not decrease by decomposition or the like, and the yield of the vinylamine unit-containing polymer to be finally obtained does not decrease as a result. Furthermore, N-methoxyethylformamide contained in crude N-vinylformamide as another impurity is hydrolyzed in the step (V) so as to be converted to one that does not affect the quality of the vinylamine unit-containing polymer.

In the method of (2), hydrogen cyanide is generated as a by-product, and thus it is required to conduct multistage precision distillation accompanied by reflux for the separation of hydrogen cyanide.

In the method of (3), formamide is generated in the same moles as N-vinylformamide, and thus it is required to conduct multistage precision distillation accompanied by reflux.

In a case in which the thermal decomposition product (crude N-vinylformamide) obtained by the method of (1) is subjected to the step (II) without conducting the multistage precision distillation accompanied by reflux, formamide remains in the polymerization product (b) since it is not polymerized and the boiling point thereof is higher.

However, in the invention, formamide may remain in crude N-vinylformamide or the polymerization product (b) in a certain amount since formamide is hydrolyzed in the step (V).

The content of formamide in crude N-vinylformamide is 1 part by mass or more with respect to 100 parts by mass of N-vinylformamide. When the content of formamide is 1 part by mass or more, it is not required to conduct multistage precision distillation accompanied by reflux, the yield of N-vinylformamide does not decrease by decomposition or the like, and the yield of the vinylamine unit-containing polymer to be finally obtained does not decrease as a result.

In addition, when the content of formamide is 1 part by mass or more, the content of formamide in the polymerization product (b) obtained by polymerizing a monomer component in the mixture for polymerization (a) prepared by using crude N-vinylformamide is also 1 part by mass or more. Hence, formamide having a higher boiling point remains although the polymerization product (b) is dried so that moisture is sufficiently removed in the step (IV), and thus the dried polymerization product (b) is not too hard so as to be easily crushed when being formed into a powder.

The content of formamide in crude N-vinylformamide is preferably 20 parts by mass or less, more preferably 10 parts by mass or less, and even more preferably 7 parts by mass or less with respect to 100 parts by mass of N-vinylformamide for the following reasons.

A preferred upper limit of the content of formamide is dependent on the rate of hydrolysis when the N-vinylformamide unit-containing polymer is converted to a vinylamine unit-containing polymer through hydrolysis of the formamide group. In other words, formamide is decomposed by taking advantage of the fact that the hydrolysis rate of remaining formamide is sufficiently faster as compared to the hydrolysis rate of the formamide group in the N-vinylformamide unit-containing polymer in the step (V) as to be described later. Hence, it is concerned that a great amount of formamide remains in the hydrolysis product (c) containing the vinylamine unit-containing polymer when the content of formamide is too high so that it is impossible to take the advantage of a difference in hydrolysis rate.

The amount of substance (mole) of formamide contained in crude N-vinylformamide is preferably smaller than the amount of substance (mole) of the formamide group to be hydrolyzed in the N-vinylformamide unit-containing polymer, and it is more preferably 50% by mole or less and even more preferably 30% by mole or less of the formamide group to be hydrolyzed in the N-vinylformamide unit-containing polymer for the following reasons.

For example, in the case of attempting to convert 15% by mole of the formamide group in the N-vinylformamide unit-containing polymer to an amino group through hydrolysis, hydrolysis of the formamide group in the N-vinylformamide unit-containing polymer also further proceeds when it is attempted to hydrolyze the entire formamide if 15% by mole or more of formamide remains in the polymerization product (b).

The thermal decomposition product (crude N-vinylformamide) obtained by the method of (1) contains methanol as a by-product, components (coloring component and the like) having a higher boiling point, and the like, and thus it is preferable to purify the thermal decomposition product by separating methanol, components having a higher boiling point, and the like therefrom by a purification method that is not accompanied by reflux.

Examples of the purification method that is not accompanied by reflux may include a method to evaporate methanol under reduced pressure in the case of separating methanol. Examples thereof may include simple distillation of a wet wall type and thin film evaporation of a type to forcibly form a thin film in the case of separating components having a higher boiling point.

It is possible to minimize the loss of N-vinylformamide associated with the purification by employing a purification method that is not accompanied by reflux. The loss of N-vinylformamide associated with the purification is specifically preferably 10 parts by mass or less and more preferably 8 parts by mass or less with respect to 100 parts by mass of N-vinylformamide before the purification.

From the facts described above, the step (I) is preferably the following step (I').

(I') A step of obtaining a thermal decomposition product containing N-vinylformamide and formamide through the thermal decomposition treatment of crude N-methoxyethylformamide containing N-methoxyethylformamide and formamide and obtaining crude N-vinylformamide having a content of formamide of 1 part by mass or more with respect to 100 parts by mass of N-vinylformamide through purification of the thermal decomposition product by a purification method that is not accompanied by reflux.

(Step (II))

In order to prepare a mixture for polymerization (a) containing N-vinylformamide as a monomer component by using crude N-vinylformamide having a content of formamide of 1 part by mass or more with respect to 100 parts by mass of N-vinylformamide, formamide is contained in the mixture for polymerization (a) at 1 part by mass or more with respect to N-vinylformamide (100 parts by mass).

The mixture for polymerization (a) may contain other monomers other than N-vinylformamide as a monomer component.

Examples of the other monomers may include (meth)acrylic acid, salts of (meth)acrylic acid, (meth)acrylic acid esters, (meth)acrylonitrile, (meth)acrylamide, N-alkyl(meth)acrylamide, N,N-dialkyl(meth)acrylamide, dialkylaminoethyl(meth)acrylamide, salts or quaternarized products of dialkylaminoethyl(meth)acrylamide, dialkylaminopropyl(meth)acrylamide, salts or quaternarized products of dialkylaminopropyl(meth)acrylamide, diacetoneacrylamide, N-vinylpyrrolidone, N-vinylcaprolactam, and vinyl acetate.

The proportion of N-vinylformamide in 100% by mole of the monomer component is usually 5% by mole or more, preferably 10% by mole or more, more preferably 50% by mole or more, and even more preferably from 70 to 100% by mole. The properties of N-vinylformamide are further exerted as the proportion thereof is higher. The proportion of each monomer is reflected as the proportion of each constitutional unit in the N-vinylformamide unit-containing polymer or the vinylamine unit-containing polymer.

The mixture for polymerization (a) may contain a polymerization initiator, a solvent, and other known additives other than the monomer component and formamide if necessary.

The polymerization initiator may be appropriately selected from known polymerization initiators depending on the polymerization method to be employed in the step (Ill). Examples of the polymerization initiator may include an azo-based initiator, a redox-based initiator, a peroxide-based initiator, and a photopolymerization initiator.

Examples of the azo-based initiator may include a water-soluble azo-based initiator or an oil-soluble azo-based initiator.

Specific examples of the water-soluble azo-based initiator may include 2,2'-azobis(amidinopropane)dihydrochloride, 2,2'-azobis[2-(5-methyl-2-imidazolin-2-yl)propane]dihydrochloride, and 4,4'-azobis(4-cyanovaleric acid).

Specific examples of the oil-soluble azo-based initiator may include 2,2'-azobisisobutyronitrile, 1,1'-azobis(cyclohexanecarbonitrile), 2,2'-azobis(2-methylbutyronitrile), 2,2'-azobis(2-methylpropionate), and 4,4'-azobis(4-methoxy-2,4-dimethyl)valeronitrile.

Specific examples of the redox-based initiator may include a combination of at least one kind of peroxide such as tert-butyl hydroperoxide or ammonium peroxodisulfate with at least one kind selected from sodium sulfite, sodium hydrogen sulfite, trimethylamine, tetramethylethylenediamine, or ferrous sulfate. In particular, ferrous sulfate is preferable since it is hardly affected by the impurities contained in crude N-vinylformamide and thus can maintain a sufficient rate of polymerization even when the purity of crude N-vinylformamide used to prepare the mixture for polymerization (a) is low.

Specific examples of the peroxide-based initiator may include tert-butyl hydroperoxide, ammonium peroxodisulfate, potassium peroxodisulfate, hydrogen peroxide, benzoyl peroxide, lauroyl peroxide, octanoyl peroxide, succinic peroxide, and tert-butylperoxy-2-ethyl hexanoate.

The photopolymerization initiator can be appropriately selected from known compounds. Examples thereof may include a benzophenone-based photopolymerization initiator, a benzoin-based photopolymerization initiator, a benzoin alkyl ether-based photopolymerization initiator, a benzyl dimethyl ketal-based photopolymerization initiator, an ax-hydroxy ketone-based photopolymerization initiator, and bis(acyl)phosphine oxide-based photopolymerization initiator. Specific examples thereof may include benzophenone, benzoin, benzoin ethyl ether, 2,2-dimethoxy-1,2-diphenyl-ethane-1-one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one, 2-methyl-1-[4-(methylthio)phenyl]-2-morpholinopropan-1-one, 2-benzyl-2-dimethylamino-1-(4-morpholinophenyl)-1-butan-1-one, bis(2,6-dimethoxybenzoyl)2,4,4-trimethyl-1-pentylphosphine oxide, bis(2,4,6-trimethylbenzoyl)-phenylphosphine oxide, and (2,4,6-trimethylbenzoyl)-diphenylphosphine oxide.

The solvent may be appropriately selected from known solvents depending on the polymerization method to be employed in the step (111). Examples of the solvent may include water and a hydrocarbon-based solvent.

Examples of other additives may include a gel quality improving agent (a polyalkylene glycol and the like), a pH adjusting agent (phosphoric acid and the like), an inorganic salt, a chain transfer agent, an emulsifier (dispersion stabilizer), and a sensitizer.

(Step (III))

Examples of the method for polymerizing a monomer component containing N-vinylformamide may include an aqueous solution polymerization method, an aqueous solution adiabatic polymerization method, a reversed phase suspension polymerization method, an emulsion polymerization method, and a sheet-like photopolymerization method.

The polymerization of the monomer component is usually conducted at a pH of from 5 to 9. The hydrolysis of N-vinylformamide is suppressed in a pH range of from 5 to 9.

The temperature for polymerization varies depending on the polymerization method, but it is usually from 0 to 110° C. and preferably from 0 to 100° C.

Formamide has a greater chain transfer constant than water, and thus the molecular weight of the N-vinylformamide unit-containing polymer to be obtained by polymerizing the monomer component in the presence of formamide is lower than of the N-vinylformamide unit-containing polymer to be obtained by polymerizing the monomer component in the absence of formamide. However, the degree of decrease in molecular weight is to the extent to which the reduced viscosity decreases by 10% in a case in which formamide is present at 3 parts by mass with respect to 100 parts by mass of N-vinylformamide. Hence, it is possible to suppress a decrease in molecular weight by the polymerization initiator or by adjusting the temperature for polymerization when formamide is present at several parts by mass with respect to 100 parts by mass of N-vinylformamide.

It is easy to crush the polymerization product (b) when drying and forming it into a powder in the step (IV) when formamide is contained in the polymerization product (b) to be obtained in the step (III).

The content of formamide in the polymerization product (b) is preferably from 1 to 20 parts by mass, more preferably from 1 to 10 parts by mass, and even more preferably from 1 to 7 parts by mass with respect to 100 parts by mass of the N-vinylformamide unit-containing polymer for the following reasons.

A preferred upper limit of the content of formamide is dependent on the rate of hydrolysis when the N-vinylformamide unit-containing polymer is converted to a vinylamine unit-containing polymer through hydrolysis of the formamide group. In other words, formamide is decomposed by taking advantage of the fact that the hydrolysis rate of remaining formamide is sufficiently faster as compared to the hydrolysis rate of the formamide group in the N-vinylformamide unit-containing polymer in the step (V) as to be described later. Hence, it is concerned that a great amount of formamide remains in the hydrolysis product (c) containing the vinylamine unit-containing polymer when the content of formamide is too high so that it is impossible to take the advantage of a difference in hydrolysis rate.

A preferred lower limit of the content of formamide is dependent on the crushability of the polymerization product (b). In other words, when the content of formamide is high, formamide having a higher boiling point remains although the polymerization product (b) is dried so that moisture is sufficiently removed in the step (IV), and thus the polymerization product (b) having a hardness so as to be easily crushed is obtained even without strict control of the moisture to be removed. On the other hand, when the content of formamide is low, it is difficult to control the moisture content since the range of moisture content in which the polymerization product (b) having a hardness so as to be easily crushed is obtained is narrow.

(Step (IV))

The state of the polymerization product (b) to be obtained in the step (III) is a massive aqueous gel in the case of aqueous solution adiabatic polymerization and sheet-like photopolymerization, and it is a particulate gel dispersion in a non-aqueous solvent in the case of reversed phase suspension polymerization. The polymerization product (b) may be subjected to the step (V) in this state or the polymerization product (b) may be subjected to the step (V) after being dried and formed into a powder. Incidentally, in the case of decreasing the moisture content of the polymerization product (b) through drying, the polymerization product (b) after drying is also referred to as the "dried body". It is preferable to dry the polymerization product (b) and to form it into a powder by a known method from the viewpoint of efficiently conducting the hydrolysis treatment of the polymerization product (b) in the step (V). The powdery polymerization product (b) is subjected to the step (V) after being dissolved or dispersed in water again.

When drying and forming the polymerization product (b) into a powder, crushing is difficult when a great amount of moisture remains in the polymerization product (b) since the dried body is soft. Crushing is difficult when moisture is removed too much since the dried body is too hard. The moisture content in the dried body is usually controlled by adjusting the drying temperature or the retention time, but control of the moisture content is not easy in the case of the polymerization product (b) having a low content of formamide since the range for adjusting the drying temperature or retention time is narrow. On the other hand, in the case of the polymerization product (b) having a high content of formamide, formamide does not evaporate at the drying temperature for removing the moisture but remains in the dried body since formamide has a higher boiling point. The dried body is unlikely to be hard and the range for adjusting the drying temperature or retention time is wide when formamide remains, and thus control of the moisture content is easy and it is possible to obtain a dried body to be easily crushed as a result.

(Step (V))

In the invention, it is essential to hydrolyze formamide, and thus the final product is the vinylamine unit-containing polymer obtained as the formamide group in the N-vinylformamide unit-containing polymer is hydrolyzed.

The hydrolysis treatment of the polymerization product (b) is conducted in the presence of water. Specifically, the hydrolysis treatment is conducted in a state of massive aqueous gel obtained by aqueous solution adiabatic polymerization or sheet-like photopolymerization in the step (III); a state of a particulate gel dispersion in a non-aqueous solvent obtained by reversed phase suspension polymerization in the step (III); a state that the powdery polymerization product (b) obtained in the step (IV) is dissolved or dispersed in water; and the like.

The hydrolysis treatment of the polymerization product (b) is conducted in the presence of an acid or a base. A strong acid is preferable as the acid, and a strong base is preferable as the base. Here, the term "strong acid" means a compound of which an aqueous solution has an acid dissociation constant $pK_a$ of 0 or less at 25° C. In addition, the term "strong base" means a compound of which an aqueous solution has a base dissociation constant $pK_b$ of 0 or less at 25° C. As the strong acid, a monovalent mineral acid such as hydrochloric acid or nitric acid is preferable. As the strong base, lithium hydroxide, sodium hydroxide, potassium hydroxide, and the like are preferable. In the presence of a strong acid or a strong base, the hydrolysis rate of formamide is sufficiently faster than the hydrolysis rate of the formamide group in the N-vinylformamide unit-containing polymer.

When conducting the hydrolysis treatment of the polymerization product (b), the rate of hydrolysis of the formamide group in the N-vinylformamide unit-containing polymer is preferably 10% by mole or more of 100% by mole of the formamide group before the hydrolysis treatment. It is concerned that it is difficult to accurately adjust the rate of hydrolysis in a case in which the target rate of hydrolysis is too low. The upper limit of the rate of hydrolysis is preferably 80% by mole or less of 100% by mole of the formamide group before the hydrolysis treatment. An excess amount of acid or base is required in a case in which more than 80% by mole of the formamide group in the N-vinylformamide unit-containing polymer is hydrolyzed.

The amount of acid or base may be adjusted by estimating the amount of acid or base required for the hydrolysis of formamide, the formamide group in the N-vinylformamide unit-containing polymer, and the like. By estimating the amount of acid or base required for the hydrolysis, it is possible to hydrolyze the formamide group in the N-vinylformamide unit-containing polymer by the target rate of hydrolysis regardless of the content of formamide contained in the polymerized product (b). In this case, it is preferable that the amount of substance (mole) of formamide contained in the polymerized product (b) is smaller than the amount of substance (mole) of the formamide group to be hydrolyzed in the N-vinylformamide unit-containing polymer. The amount of acid or base is basically the amount of substance that is enough to hydrolyze the amount of substance of formamide, the amount of substance of other low molecular weight compounds to be hydrolyzed, and the amount of substance of the formamide group to be hydrolyzed in the N-vinylformamide unit-containing polymer. It is required to adjust the amount of acid or base particularly in a case in which the target rate of hydrolysis of the formamide group in the N-vinylformamide unit-containing polymer is low.

It is preferable to conduct the hydrolysis treatment of the polymerization product (b) at 50° C. or higher and it is more preferable to conduct the hydrolysis treatment of the polymerization product (b) at from 50 to 100° C. When the temperature for conducting the hydrolysis treatment of the polymerization product (b) is 50° C. or higher, the hydrolysis reaction is promoted and a desired rate of hydrolysis is obtained in a relatively short time. When the temperature for conducting the hydrolysis treatment of the polymerization product (b) is 100° C. or lower, a decrease in molecular weight or insolubilization due to heat is not caused and a high-quality vinylamine unit-containing polymer is obtained.

The time for hydrolysis treatment of the polymerization product (b) may be appropriately determined depending on the content of formamide, the target rate of hydrolysis, the temperature when conducting the hydrolysis treatment of the polymerization product (b), and the like.

The content of formamide in the hydrolysis product (c) is preferably from 0.1 part by mass or less and more preferably 0.05 part by mass or less with respect to 100 parts by mass of the vinylamine unit-containing polymer. It is possible to sufficiently decrease the influence of formamide on the quality of the vinylamine unit-containing polymer when the content of formamide is 0.1 part by mass or less.

The hydrolysis product (c) contains ammonia and formic acid formed by the hydrolysis of formamide, formic acid generated by the hydrolysis of the formamide group in the N-vinylformamide unit-containing polymer, and ammonia, formic acid, and acetaldehyde generated by the hydrolysis of N-methoxyethylformamide.

Formic acid may be removed by a known method. Specific examples thereof may include a method in which formic acid is esterified by adding an alcohol under an acidic condition and distilled off.

Ammonia may be removed by aeration through nitrogen, the air, or the like, or it may be left in the hydrolysis product (c) in the form of a salt through neutralization.

Acetaldehyde causes crosslinking insolubilization of the vinylamine unit-containing polymer at the time of the hydrolysis treatment in some cases, and thus it is preferable to remove acetaldehyde by a known method. Specific examples of the method may include a method to reduce acetaldehyde with a reducing agent and a method to form an oxime by treating acetaldehyde with hydroxylamine.

(Mechanism of Action)

In the method for producing a vinylamine unit-containing polymer of the invention described above, formamide is sufficiently hydrolyzed when the hydrolysis treatment of the polymerization product (b) containing the N-vinylformamide unit-containing polymer and formamide is conducted by using an acid (preferably a strong acid) or a base (preferably a strong base). Hence, it is possible to produce a high-quality vinylamine unit-containing polymer in which a smaller amount of formamide is mixed even though crude N-vinylformamide having the content of formamide of 1 part by mass or more with respect to 100 parts by mass of N-vinylformamide is used as a raw material. In addition, upon the polymerization of N-vinylformamide, a decrease in molecular weight (reduced viscosity) of the N-vinylformamide unit-containing polymer is suppressed although the monomer component containing N-vinylformamide is polymerized in the mixture for polymerization (a) in which the content of formamide is 1 part by mass or more with respect to 100 parts by mass of N-vinylformamide since the chain transfer constant of formamide is not so great. Hence, a decrease in molecular weight (reduced viscosity) of the vinylamine unit-containing polymer to be finally obtained is also suppressed.

In addition, the purification of crude N-vinylformamide can be omitted or the purification of crude N-vinylformamide can be conducted by a purification method that is not accompanied by reflux in the step (I) that is a step of producing crude N-vinylformamide by using crude N-vinylformamide having the content of formamide of 1 part by mass or more with respect to 100 parts by mass of N-vinylformamide as a raw material. In other words, the step (I) can be simplified as compared to the case of conducting multistage precision distillation accompanied by reflux of the prior art. As a result, the following advantages are also obtained.

The step (I) can be simplified, thus crude N-vinylformamide can be produced at low cost, and the vinylamine unit-containing polymer to be finally obtained can also be produced at low cost as a result.

It is not required to conduct multistage precision distillation accompanied by reflux in the step (I), thus the yield of N-vinylformamide does not decrease by decomposition or the like, and the yield of the vinylamine unit-containing polymer to be finally obtained does not decrease as a result.

It is not required to conduct multistage precision distillation accompanied by reflux in the step (I), and thus it is possible to relatively safely conduct the step (I).

In addition, the content of formamide is 1 part by mass or more with respect to 100 parts by mass of the N-vinylformamide unit-containing polymer in the polymerization product of the invention described above, and thus formamide having a higher boiling point remains although the polymerization product is dried so that moisture is sufficiently removed. Hence, the dried polymerization product is not too hard so as to be easily crushed when being formed into a powder.

EXAMPLES

Hereinafter, the invention will be more specifically described with reference to Examples, but the invention is not limited thereto.

(Reduced Viscosity of N-Vinylformamide Unit-Containing Polymer)

The polymerization product (b) containing the N-vinylformamide unit-containing polymer and formamide was dissolved in 1 N saline solution so as to have the concentration of the N-vinylformamide unit-containing polymer of 0.1 g/dL, thereby obtaining a sample solution. The flow time of the sample solution was measured at 25° C. by using the Ostwald viscometer. In the same manner, the flow time of 1 N saline solution was measured, and the reduced viscosity of the N-vinylformamide unit-containing polymer was determined by the following equation.

$$\eta_{sp}/C=(t-t_0)/t_0/0.1$$

Where, $\eta_{sp}/C$ denotes the reduced viscosity (dL/g), t denotes the flow time (seconds) of the sample solution, and to denotes the flow time (seconds) of 1 N saline solution.

(Reduced Viscosity of Vinylamine Unit-Containing Polymer)

The hydrolysis product (c) containing a vinylamine unit-containing polymer was dissolved in 1 N saline solution so as to have the concentration of the vinylamine unit-containing polymer of 0.1 g/dL, thereby obtaining a sample solution. The flow time of the sample solution was measured at 25° C. by using the Ostwald viscometer. In the same manner, the flow time of 1 N saline solution was measured, and the reduced viscosity of the vinylamine unit-containing polymer was determined by the following equation.

$$\eta_{sp}/C=(t-t_0)/t_0/0.1$$

Where, $\eta_{sp}/C$ denotes the reduced viscosity (dL/g), t denotes the flow time (seconds) of the sample solution, and to denotes the flow time (seconds) of 1 N saline solution.

(Content of Formamide and N-Methoxyethylformamide in Polymerization Product (b))

The polymerization product (b) was weighed in a 50 mL Erlenmeyer flask, isopropyl alcohol was added thereto so as to have the concentration of the polymerization product (b) of 10% by mass, and the mixture was stirred for 5.5 hours. Into a 25 mL volumetric flask, 2.5 mL of the supernatant after stirring was put and diluted by adding a 0.01 mol/L aqueous solution of sodium dihydrogenphosphate to the mark. The diluted solution was analyzed by liquid chromatography using the following apparatus under the following conditions to determine the content (parts by mass) of formamide and the content (parts by mass) of N-methoxyethylformamide with respect to the N-vinylformamide unit-containing polymer (100 parts by mass).

Analysis system: LC analysis system manufactured by SHIMADZU CORPORATION,
Column: ODP column (ShodexODP 4.6 mm×250 mmH),
Eluent: 0.01 mol/L aqueous solution of sodium dihydrogenphosphate,
Flow velocity: 1 mL/min,
Temperature for analysis: 40° C.,
Injection volume of sample: 20 μL, and
Detector: UV detector (wavelength: 200 nm).

(Content of Formamide in Hydrolysis Product (c))

The hydrolysis product (c) was weighed in a 50 mL Erlenmeyer flask, isopropyl alcohol was added thereto so as to have the concentration of the hydrolysis product (c) of 10% by mass, and the mixture was stirred for 5.5 hours. Into a 25 mL volumetric flask, 2.5 mL of the supernatant after stirring was put and diluted by adding a 0.01 mol/L aqueous solution of sodium dihydrogenphosphate to the mark. The diluted solution was analyzed by liquid chromatography using the following apparatus under the following conditions to determine the content of formamide (parts by mass) with respect to the vinylamine unit-containing polymer (100 parts by mass).

Analysis system: LC analysis system manufactured by SHIMADZU CORPORATION,
Column: ODP column (ShodexODP 4.6 mm×250 mmH),
Eluent: 0.01 mol/L aqueous solution of sodium dihydrogenphosphate,
Flow velocity: 1 mL/min,
Temperature for analysis: 40° C.,
Injection volume of sample: 20 μL, and
Detector: UV detector (wavelength: 200 nm).

(Rate of Hydrolysis of Formamide Group in N-Vinylformamide Unit-Containing Polymer)

The hydrolysis product (c) was dissolved in demineralized water so as to have the concentration of the vinylamine unit-containing polymer of 0.025% by mass and titrated with a 1/400 N aqueous solution of potassium polyvinyl sulfate at the pH of 2.5 by using toluidine blue as an indicator. The cation equivalent of the vinylamine unit-containing polymer was calculated from the titer, and the rate of hydrolysis of the formamide group in the N-vinylformamide unit-containing polymer was determined by the following equation.

Rate of hydrolysis (% by mole)=cation equivalent×100/((1000−(cation equivalent×79.5))/71+cation equivalent)

Example 1

Step (I)

Crude N-methoxyethylformamide having the content of formamide of 3 parts by mass with respect to 100 parts by mass of N-methoxyethylformamide was prepared.

The crude N-methoxyethylformamide was continuously thermally decomposed in a gas phase at 450° C. under reduced pressure of 120 mmHg by using the apparatus described in JP 3-181451A to obtain a thermal decomposition product.

In the thermal decomposition product, the content of formamide was 5.5 parts by mass, the content of N-methoxyethylformamide was 2.4 parts by mass, the content of methanol was 47 parts by mass, and the content of others (components having a higher boiling point) was 6.6 parts by mass with respect to 100 parts by mass of N-vinylformamide, respectively.

Methanol was distilled off from the thermal decomposition product under reduced pressure of 100 mmHg. Furthermore, the thermal decomposition product was subjected to thin film evaporation under the conditions of 3 mmHg and 71° C. by using a horizontal centrifugal thin film evaporator, thereby obtaining crude N-vinylformamide.

In the crude N-vinylformamide, the content of formamide was 6.5 parts by mass and the content of N-methoxyethylformamide was 2.2 parts by mass with respect to 100 parts by mass of N-vinylformamide, respectively.

Step (II) to Step (IV): Aqueous Solution Adiabatic Polymerization

Deionized water, 0.3 part by mass of polyethylene glycol (average molecular weight: 20000), and the crude N-vinylformamide (amount to contain N-vinylformamide at 30 parts by mass) were mixed together so as to have a total amount of 100 parts by mass, and the mixture was then adjusted with phosphoric acid so as to have a pH of 6.3, thereby obtaining an adjusted monomer liquid.

The adjusted monomer liquid was cooled to 0° C., transferred to an adiabatic reaction vessel equipped with a thermometer, and aerated for 15 minutes with nitrogen. To the adjusted monomer liquid, a 10% by mass aqueous solution of 2,2'-azobis(2-amidinopropane)dihydrochloride (V-50 manufactured by Wako Pure Chemical Industries, Ltd.) was added such that 2,2'-azobis(2-amidinopropane)dihydrochloride was 0.15 part by mass with respect to 100 parts by mass of N-vinylformamide. Furthermore, a 10% by mass aqueous solution of tert-butyl hydroperoxide (PERBUTYL H-69 manufactured by NOF CORPORATION) was added thereto such that tert-butyl hydroperoxide was 0.03 part by mass with respect to N-vinylformamide (100 parts by mass). Furthermore, a 10% by mass aqueous solution of sodium bisulfite was added thereto such that sodium bisulfite was 0.04 part by mass with respect to 100 parts by mass of N-vinylformamide to initiate the polymerization of N-vinylformamide in the mixture for polymerization (a).

The system was further aged for 1 hour after the temperature in the system reached the maximum temperature. The polymerization product (b) of a massive aqueous gel was taken out from the reaction vessel, crushed by a meat chopper, dried for 1.5 hours in a forced-air drier at 110° C., crushed, and was allowed to pass through a sieve having a mesh size of 2 mm to obtain a powder. The time required from the start of crushing to passing through a sieve was 15 minutes. The reduced viscosity of the N-vinylformamide unit-containing polymer and the contents of formamide and N-methoxyethylformamide in the polymerization product (b) were determined. The results are presented in Table 1.

Step (V)

To an aqueous solution prepared by mixing 123 g of water, 8.5 g of a 48% by mass aqueous solution of sodium hydroxide, and 0.6 g of sodium dithionite, 15 g of the powdery polymerization product (b) was added little by little, dissolved over 2 hours at 50° C., and subjected to the hydrolysis treatment over 3 hours at 80° C., thereby obtaining the hydrolysis product (c) in an aqueous solution state. The rate of hydrolysis of the formamide group in the N-vinylformamide unit-containing polymer, the reduced viscosity of the vinylamine unit-containing polymer, and the content of formamide in the hydrolysis product (c) were determined. The results are presented in Table 1.

Comparative Example 1

Production of Purified N-Vinylformamide

The multistage precision distillation of the crude N-vinylformamide obtained in Example 1 was conducted at the raw material supply stage: the fifth stage, the top of the column: reduced pressure of 4 mmHg, reflux ratio: 2 by using a fractionator (13 stages) which had a diameter of 5 cm and filled with the structured packing (Sulzer laboratory packing), and purified N-vinylformamide was obtained from the top. Upon the distillation, para-benzoquinone was added to the crude N-vinylformamide so as to be 0.03 parts by mass with respect to N-vinylformamide (100 parts by mass).

In the purified N-vinylformamide, the content of formamide was 0.8 part by mass and the content of N-methoxyethylformamide was 0.2 part by mass with respect to 100 parts by mass of N-vinylformamide, respectively. The yield of N-vinylformamide from the crude N-vinylformamide was 86% by mass.

Step (II) to Step (IV): Aqueous Solution Adiabatic Polymerization

Deionized water, 0.3 part by mass of polyethylene glycol (average molecular weight: 20000), and the purified N-vinylformamide (amount to contain N-vinylformamide at 30 parts by mass) were mixed together so as to have a total amount of 100 parts by mass, and the mixture was then adjusted with phosphoric acid so as to have a pH of 6.3, thereby obtaining an adjusted monomer liquid.

The adjusted monomer liquid was cooled to 0° C., transferred to an adiabatic reaction vessel equipped with a thermometer, and aerated for 15 minutes with nitrogen. To the adjusted monomer liquid, a 10% by mass aqueous solution of 2,2'-azobis(2-amidinopropane)dihydrochloride (V-50 manufactured by Wako Pure Chemical Industries, Ltd.) was added such that 2,2'-azobis(2-amidinopropane)dihydrochloride was 0.15 part by mass with respect to N-vinylformamide (100 parts by mass). Furthermore, a 10% by mass aqueous solution of tert-butyl hydroperoxide (PERBUTYL H-69 manufactured by NOF CORPORATION) was added thereto such that tert-butyl hydroperoxide was 0.02 part by mass with respect to 100 parts by mass of N-vinylformamide. Furthermore, a 10% by mass aqueous solution of sodium bisulfite was added thereto such that sodium bisulfite was 0.02 part by mass with respect to 100 parts by mass of N-vinylformamide to initiate the polymerization of N-vinylformamide in the mixture for polymerization (a).

The system was further aged for 1 hour after the temperature in the system reached the maximum temperature. The polymerization product (b) of a massive aqueous gel was taken out from the reaction vessel, crushed by a meat chopper, dried for 1.5 hours in a forced-air drier at 110° C., crushed, and was allowed to pass through a sieve having a mesh size of 2 mm to obtain a powder. The time required from the start of crushing to passing through a sieve was 30 minutes. The reduced viscosity of the N-vinylformamide unit-containing polymer and the contents of formamide and N-methoxyethylformamide in the polymerization product (b) were determined. The results are presented in Table 1.

Step (V)

To an aqueous solution prepared by mixing 123 g of water, 7.2 g of a 48% by mass aqueous solution of sodium hydroxide, and 0.6 g of sodium dithionite, 15 g of the powdery polymerization product (b) was added little by little, dissolved over 2 hours at 50° C., and subjected to the hydrolysis treatment over 3 hours at 80° C., thereby obtaining the hydrolysis product (c) in an aqueous solution state. The rate of hydrolysis of the formamide group in the N-vinylformamide unit-containing polymer, the reduced viscosity of the vinylamine unit-containing polymer, and the content of formamide in the hydrolysis product (c) were determined. The results are presented in Table 1.

Example 2

Step (II) and Step (III): Reversed Phase Suspension Polymerization

Deionized water and the crude N-vinylformamide (amount to contain N-vinylformamide at 80 g) obtained in Example 1 were mixed together so as to have a total amount of 95 g, and sodium hypophosphite (amount to be 0.025 part by mass with respect to 100 parts by mass of N-vinylformamide) and 2,2'-azobis(2-amidinopropane)dihydrochloride (V-50 manufactured by Wako Pure Chemical Industries, Ltd.) (amount to be 0.4 part by mass with respect to 100 parts by mass of N-vinylformamide) were added thereto, thereby obtaining the mixture for polymerization (a).

Into a reaction vessel equipped with a stirrer, a dropping funnel, and a jacket, 400 mL of cyclohexane, 9.4 g of an emulsifier (polyoxyethylene alkyl ether, HLB: 14), 20 g of a 20% by mass aqueous solution of ammonium chloride, and 24 g of demineralized water were put. The temperature thereof was raised to 55° C., the mixture for polymerization (a) was added thereto dropwise over 3 hours while stirring the mixture, and the mixture was maintained at 56° C. for further 2 hours, thereby obtaining the polymerization product (b).

A part of the polymerization product (b) was taken out from the reaction vessel, dried for 1.5 hours in a vacuum dryer at 60° C., crushed, and was allowed to pass through a sieve having a mesh size of 2 mm to obtain a powder. The time required from the start of crushing to passing through a sieve was 5 minutes. The reduced viscosity of the N-vinylformamide unit-containing polymer and the contents of formamide and N-methoxyethylformamide in the polymerization product (b) were determined. The results are presented in Table 2.

Step (V)

To the polymerization product (b), 24 g of a 25% by mass aqueous solution of hydroxylamine sulfate was added, 20.7 g of hydrogen chloride gas was blown thereinto, and the mixture was refluxed for 3 hours at 80° C. The temperature thereof was lowered to 50° C., 18 g of methanol was added thereto, and the mixture was stirred at 65° C. The temperature thereof was raised from 70 to 77° C., and an operation to condense evaporated water and cyclohexane and to reflux only cyclohexane was conducted for 30 minutes to dehydrate, thereby obtaining the powdery hydrolysis product (c). The rate of hydrolysis of the formamide group in the N-vinylformamide unit-containing polymer, the reduced viscosity of the vinylamine unit-containing polymer, and the content of formamide in the hydrolysis product (c) were determined. The results are presented in Table 2.

Comparative Example 2

Step (II) and Step (III): Reversed Phase Suspension Polymerization

Deionized water and the purified N-vinylformamide (amount to contain N-vinylformamide at 80 g) obtained in Comparative Example 1 were mixed together so as to have a total amount of 95 g, and sodium hypophosphite (amount to be 0.037 part by mass with respect to 100 parts by mass of N-vinylformamide) and 2,2'-azobis(2-amidinopropane)dihydrochloride (V-50 manufactured by Wako Pure Chemical Industries, Ltd.) (amount to be 0.4 part by mass with respect to 100 parts by mass of N-vinylformamide) were added thereto, thereby obtaining the mixture for polymerization (a).

In a reaction vessel equipped with a stirrer, a dropping funnel, and a jacket, 400 mL of cyclohexane, 9.4 g of an emulsifier (polyoxyethylene alkyl ether, HLB: 14), 20 g of a 20% by mass aqueous solution of ammonium chloride, and 24 g of demineralized water were put. The temperature thereof was raised to 55° C., the mixture for polymerization (a) was added thereto dropwise over 3 hours while stirring the mixture, and the mixture was maintained at 56° C. for further 2 hours, thereby obtaining the polymerization product (b).

A part of the polymerization product (b) was taken out from the reaction vessel, dried for 1.5 hours in a vacuum dryer at 60° C., crushed, and was allowed to pass through a sieve having a mesh size of 2 mm to obtain a powder. The time required from the start of crushing to passing through a sieve was 10 minutes. The reduced viscosity of the N-vinylformamide unit-containing polymer and the contents of formamide and N-methoxyethylformamide in the polymerization product (b) were determined. The results are presented in Table 2.

Step (V)

To the polymerization product (b), 24 g of a 25% by mass aqueous solution of hydroxylamine sulfate was added, 17 g of hydrogen chloride gas was blown thereinto, and the mixture was refluxed for 3 hours at 80° C. The temperature thereof was lowered to 50° C., 15 g of methanol was added thereto, and the mixture was stirred at 65° C. The temperature thereof was raised from 70 to 77° C., and an operation to condense evaporated water and cyclohexane and to reflux only cyclohexane was conducted for 30 minutes to dehydrate, thereby obtaining the powdery hydrolysis product (c). The rate of hydrolysis of the formamide group in the N-vinylformamide unit-containing polymer, the reduced viscosity of the vinylamine unit-containing polymer, and the content of formamide in the hydrolysis product (c) were determined.

Example 3

The polymerization was conducted in the same manner as in Example 1 except that 5 parts by mass of an aqueous solution of ferrous sulfate (ferrous sulfate was 0.005 part by mass with respect to 100 parts by mass of N-vinylformamide) were added in addition to the polymerization initiator used in Example 1. The time required for the temperature in the system to reach the maximum temperature was 240 minutes although it was 310 minutes in Example 1, and thus the improvement in rate of polymerization was achieved.

TABLE 1

| | (Aqueous solution adiabatic polymerization) | Example 1 | Comparative Example 1 |
|---|---|---|---|
| | Monomer-containing raw material used | Crude N-vinylformamide | Purified N-vinylformamide |
| | Content of formamide with respect to 100 parts by mass of N-vinylformamide | 5.5 parts by mass | 0.8 part by mass |
| | Amount of V-50 added with respect to 100 parts by mass of monomer | 0.15 part by mass | 0.15 part by mass |
| | Amount of PERBUTYL H-69 added with respect to 100 parts by mass of monomer | 0.03 part by mass | 0.02 part by mass |
| | Amount of sodium bisulfite added with respect to 100 parts by mass of monomer | 0.04 part by mass | 0.02 part by mass |
| | Time required for inside of system to reach maximum temperature | 310 minutes | 270 minutes |
| | Yield of polymerization | 99.8% | 99.8% |
| Polymerization product (b) | Time required for crushing of polymerization product (b) | 15 minutes | 30 minutes |
| | Reduced viscosity of N-vinylformamide unit-containing polymer | 7.7 dL/g | 8.1 dL/g |
| | Content of formamide with respect to 100 parts by mass of polymer | 4.1 parts by mass | 0.5 part by mass |
| | Content of N-methoxyethylformamide with respect to 100 parts by mass of polymer | 1.2 parts by mass | 0.14 part by mass |
| | Amount of 48% by mass aqueous solution of sodium hydroxide added | 8.5 g | 7.2 g |
| Hydrolysis product (c) | Rate of hydrolysis of formamide group | 41.2% by mole | 40.1% by mole |
| | Reduced viscosity of vinylamine unit-containing polymer | 4.3 dL/g | 4.5 dL/g |
| | Content of formamide with respect to 100 parts by mass of polymer | 0.04 part by mass | 0.01 part by mass |
| | Overall yield from crude N-vinylformamide | 99.8% | 85.8% |

TABLE 2

| | (Reversed phase suspension polymerization) | Example 2 | Comparative Example 2 |
|---|---|---|---|
| | Monomer-containing raw material used | Crude N-vinylformamide | Purified N-vinyl formamide |
| | Content of formamide with respect to 100 parts by mass of N-vinylformamide | 5.5 parts by mass | 0.8 part by mass |
| | Amount of sodium hypophosphite added with respect to 100 parts by mass of monomer | 0.025 part by mass | 0.037 part by mass |
| | Amount of V-50 added with respect to 100 parts by mass of monomer | 0.4 part by mass | 0.4 part by mass |
| | Yield of polymerization | 99.8% | 99.8% |
| Polymerization product (b) | Time required for crushing of polymerization product (b) | 5 minutes | 10 minutes |
| | Reduced viscosity of N-vinylformamide unit-containing polymer | 5.0 dL/g | 5.1 dL/g |
| | Content of formamide with respect to 100 parts by mass of polymer | 3.7 parts by mass | 0.3 part by mass |
| | Content of N-methoxyethylformamide with respect to 100 parts by mass of polymer | 0.9 part by mass | 0.11 part by mass |
| | Amount of hydrogen chloride gas added | 20.7 g | 17 g |
| Hydrolysis product (c) | Rate of hydrolysis of formamide group | 41.3% by mole | 41.9% by mole |
| | Reduced viscosity of vinylamine unit-containing polymer | 3.1 dL/g | 3.3 dL/g |
| | Content of formamide with respect to 100 parts by mass of polymer | 0.003 part by mass | 0.003 part by mass |
| | Overall yield from crude N-vinylformamide | 99.8% | 85.8% |

As described above, polymers having approximately the same molecular weight (reduced viscosity) as the case of using purified N-vinylformamide were obtained by both the aqueous solution adiabatic polymerization and the reversed phase suspension polymerization through the adjustment of the polymerization conditions even when crude N-vinylformamide was used in the step (II) without conducting the multistage precision distillation accompanied by reflux in the step (I). In addition, the amount of formamide mixed in the vinylamine unit-containing polymer obtained in the step (V) was significantly small although crude N-vinylformamide was used in the step (II). Furthermore, the overall yield was greatly improved in Examples 1 and 2 in which the multistage precision distillation accompanied by reflux was not conducted in the step (I) as compared to Comparative Examples 1 and 2 in which the multistage precision distillation accompanied by reflux was conducted in the step (I).

In addition, when the dried body of the polymerization product (b) was formed into a powder in the step (IV), crushing was easy and the time required from the crushing to passing through a sieve was 15 minutes in Example 1 having a high content of formamide to be half of the time in Comparative Example 1 having a low content of formamide.

In addition, the time required for the temperature in the system to reach the maximum temperature shortened in Example 3 in which ferrous sulfate was used as the polymerization initiator as compared to Example 1, and thus the improvement in rate of polymerization was achieved.

INDUSTRIAL APPLICABILITY

The vinylamine unit-containing polymer to be obtained by the production method of the invention is useful as a flocculant, a papermaking chemical, a fiber treatment agent, and the like.

The invention claimed is:

1. A method for producing a vinylamine unit-containing polymer, the method comprising:
   preparing a mixture for polymerization (a) comprising N-vinylformamide as a monomer component wherein the N-vinylformamide comprises formamide and a content of the formamide is from 1 part by mass to 20 parts by mass with respect to 100 parts by mass of the N-vinylformamide;
   polymerizing the monomer component to obtain a polymerization product (b) containing an N-vinylformamide unit-containing polymer and formamide;
   preparing an aqueous mixture of the polymerization product (b);
   hydrolyzing the formamide and the formamide groups of the N-vinylformamide unit-containing polymer in the aqueous mixture in the presence of an acid or a base; and
   obtaining a hydrolysis product (c) containing a vinylamine unit-containing polymer, formic acid and ammonia;
   wherein a content of formamide in the hydrolysis product (c) is 0.1 part by mass or less with respect to 100 parts by mass of the vinylamine unit-containing polymer.

2. The method according to claim 1, wherein the hydrolysis of the formamide and the formamide groups of the N-vinylformamide unit-containing polymer in the aqueous mixture is conducted at a temperature of 50° C. or higher.

3. The method according to claim 1, wherein 10% by mole or more of 100% by mole of a formamide group before a hydrolysis treatment in the N-vinylformamide unit-containing polymer is hydrolyzed when the hydrolysis is conducted.

4. The method according to claim 1, further comprising:
   obtaining a thermal decomposition product containing N-vinylformamide and formamide through a thermal decomposition treatment of crude N-methoxyethylformamide containing N-methoxyethylformamide and formamide and obtaining crude N-vinylformamide having a content of formamide of 1 part by mass to 20 parts by mass with respect to 100 parts by mass of N-vinylformamide through purification of the thermal decomposition product by a purification method not accompanied by reflux.

5. The method according to claim 1, further comprising:
   drying and forming the polymerization product (b) into a powder before subjecting the polymerization product (b) to the hydrolysis.

6. The method according to claim 1, wherein a molar amount of formamide contained in the crude N-vinylformamide is smaller than a molar amount of a formamide group to be hydrolyzed in the N-vinylformamide unit-containing polymer.

7. The method according to claim 1, wherein the polymerization for obtaining the polymerization product (b) is an adiabatic polymerization or a photopolymerization.

8. The method according to claim 1, wherein the polymerization for obtaining the polymerization product (b) is an adiabatic polymerization and ferrous sulfate is used as a polymerization initiator.

9. The method according to claim 1, wherein the polymerization to obtain the polymerization product (b) is conducted at a pH of from 5 to 9.

* * * * *